Patented Aug. 19, 1941

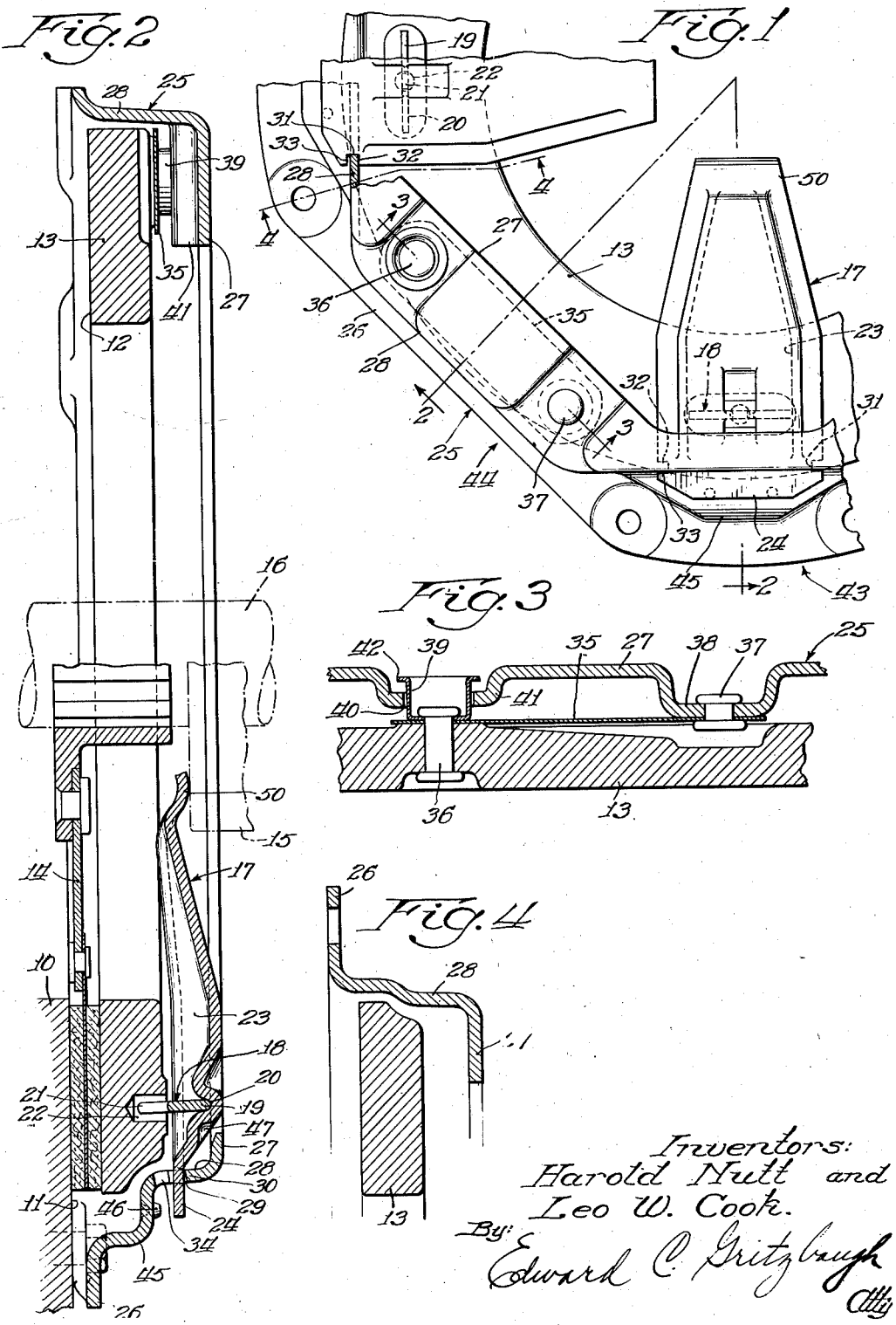

2,253,344

UNITED STATES PATENT OFFICE 2,253,344

FRICTION CLUTCH

Harold Nutt and Leo W. Cook, Chicago, Ill., assignors to Borg-Warner Corporation, Chicago, Ill., a corporation of Illinois Application September 15, 1939, Serial No. 295,004

18 Claims. (Cl. 192—68)

This invention relates to friction clutches and has as its primary object to provide a clutch of maximum compactness, particularly in an axial direction. To this end, the invention contemplates an arrangement wherein the pressure for engaging the clutch is supplied by a remote pressure spring and is applied through a series of operating levers arranged for maximum compactness and simplicity.

More specifically, the invention aims to provide an improved construction and arrangement of such operating levers and means whereby said levers are fulcrumed with respect to the driving member of the clutch, so as to take the reaction of the clutch engaging thrust.

Another object of the invention is to provide, in a clutch having the characteristics set forth above, an improved driving connection between the driving member and the pressure plate, in the form of a series of elongated flexible driving links, each having one end attached to the pressure plate and the other end attached to the fulcrum or reaction member. The invention further contemplates, in this respect, the provision of a reaction member in the form of an annulus which in addition to connecting one end of each driving link to the driving member, is adapted to form a series of fulcrums for the operating levers.

The invention further aims, in this respect, to provide a reaction member that is simple and inexpensive in construction, and provides a compact arrangement wherein the driving links are accommodated by regions of the reaction member intervening between the lever fulcruming portions thereof, substantially the entire circumference of the reaction member being thus utilized by the driving links and the levers. The regions of the reaction member which accommodate the driving links are straight and are normal to radii of the clutch axis, being preferably bisected by said radii so that the driving links may be disposed chordally with respect to the pressure plate, and may register with said regions so as to be completely covered and protected thereby and yet allow said regions to be comparatively narrow in width. In this respect, the invention aims to economize by utilizing a reaction member which is quite narrow in radial cross-section. This is made possible, first, by the driving link arrangement alluded to above, and second, by the fact that the operating levers, instead of being release levers as in the conventional clutch, are of a type adapted to apply pressure to the pressure plate, and therefore may be fulcrumed at their outer ends instead of in their intermediate regions, with respect to the reaction member.

Other and more particular objects, advantages and uses of our invention will become apparent from a reading of the following specification taken in connection with the appended drawing which forms a part thereof and wherein:

Fig. 1 is a rear elevation of a portion of a friction clutch embodying the invention, parts thereof being broken away and shown in section to better illustrate the construction.

Fig. 2 is an axial sectional view taken as indicated by the line 2—2 of Fig. 1;

Fig. 3 is a chordal sectional view thereof taken as indicated by the line 3—3 of Fig. 1; and Fig. 4 is a detailed radial sectional view thereof taken as indicated by the line 4—4 of Fig. 1.

As an example of one form in which the invention may be embodied, we have shown in the drawing a friction clutch of the type suitable for embodiment in a motor vehicle, the engine flywheel of which, indicated at 10, comprises the driving member of the clutch. Between the friction face 11 of the flywheel 10, and the friction face 12 of the pressure plate 13, a driven plate, indicated generally at 14, is adapted to be engaged.

Pressure for moving the plate 13 into engagement with the driven plate 14 is provided by a remote pressure spring and linkage of the type shown in the pending application, Serial No. 284,606, of Harold Nutt, for Friction clutch. The transmitting linkage includes a thrust collar 15, surrounding the driven shaft 16 upon which the driven plate 14 is mounted, and a series of operating levers 17 the intermediate regions of which are in thrust transmitting association with the pressure plate 13 through the medium of T-shaped thrust elements 18 each including a head portion 19 engaged in a recess 20 formed in the lever 17, and a leg portion 21 piloted in a hole 22 in the pressure plate 13. The shoulder regions of the head 19, opposite the side which is engaged in the recess 20, engaged against the rear face of the pressure plate 13, provide thrust contact with the pressure plate. The piloting of the leg 21 in the hole 22 limits the possible tilting of the thrust element so as to maintain the proper thrust connection. The head 19 is embraced between side flanges 23 of the lever 17 and thereby confined against lateral displacement with relation to the lever.

The inner ends of the levers 17 are formed with arcuate fingers 50 adapted to receive thrust from the collar 15.

The outer end of each lever 17 is provided with a fulcrum finger 24, which is fulcrumed with respect to the flywheel 10, through the medium of a reaction member 25. The reaction member 25 is roughly Z-shaped in cross section, including an outer radial flange 26, by means of which it is attached to the flywheel, an inner radial flange 27, and an axial wall 28 joining the flanges 26 and 27.

The axial wall 28 is provided with a series of fulcrum apertures 29 through each of which the fulcrum finger 24 of a lever 17 is extended. The finger 24 is fulcrumed against the region 30 of the wall 28 defining the rear extremity of the aperture 29.

The fulcrum finger 24 is provided in its respective sides with notches 31 which receive the regions of the wall 28 defining the circumferential extremities of the aperture 29 and which provide, in the fulcrum finger 24 of the lever, opposed shoulders 32 and 33 engaging the opposite sides of the wall 28 so as to restrain the lever 17 against radial displacement either inwardly or outwardly. Axially forwardly of the region of the aperture 29 in which the finger 24 is received in the assembled position of the clutch, the aperture 29 is elongated circumferentially as at 34, sufficiently to allow insertion and removal of the fulcrum finger 24.

The inner radial flange 27 of the reaction member partially overlies the pressure plate 13. It has two functions, one of which is to brace and strengthen the axial wall 28 so as to prevent any yielding thereof in a radial direction, and the other of which is to form a pocket for the accommodation of the flexible driving links which will now be described.

The flexible driving links 35 are in the form of flat strips, preferably of spring steel, each having one end attached to the rear face of the pressure plate 13 as by means of a rivet 36 and having its other end attached, as by means of a rivet 37, to a depressed region 38 of the flange 27, extending toward the pressure plate 13 to a position just short of the rear face thereof.

The driving link 35 lies substantially in the plane of the rear face of the pressure plate 13.

Secured beneath the head of the rivet 36 is a retainer cup 39 extending through an opening 40 in a depression 41 in the reaction member 25, and having a flange 42 adapted to cooperate with the depression 41 so as to limit the possible separation of the pressure plate and reaction member when detached from the flywheel 10. The depression 41 is of sufficient depth that at no time can the flange 42 project beyond the rear face of the flange 27 of the reaction member.

The invention achieves an improved compactness making the clutch particularly suitable in connection with automatic or semi-automatic transmissions which require that the space available for the engine clutch be reduced to a minimum. Along with such compactness, the invention combines a most desirable arrangement of the flexible driving link. In addition, maximum economy of construction is obtained.

The flexible driving link, which has the basic advantage of providing a noiseless driving connection between the reaction member and the pressure plate which allows these two members to freely move axially with respect to each other while the driving connection is maintained, is arranged chordally with respect to the pressure plate, with the rivets 36 and 37 equi-distant from the axis of the clutch and equi-distant from the radius to which the driving link is normal. The reaction member is formed with alternating fulcrum portions 43 and driving link pockets 44, whereby the driving links may be equi-distantly spaced around the circumference of the clutch, and accommodated in those regions of the reaction member which intervene between the lever fulcruming regions. Thus the entire circumference of the reaction member is utilized, and the fulcrum levers and driving connections may lie roughly in the same plane, thereby contributing to the axial compactness of the clutch. The driving link pockets 44 are straight, and register with the links 35, being just enough wider than the links so as to completely cover and protect them. The outer edges of the links 35 are positioned closely adjacent the wall portions 28 of the pockets. Because the links 35 are arranged chordally, it is possible to form the reaction member in the shape of a symmetrical polygon and at the same time to achieve the snug arrangement just discussed. The chordal arrangement of the driving links is most desirable for the reason that it avoids the development of radial components in the forces transmitted through the links.

The clutch is assembled by inserting the operating levers 17 through the wider portions 34 of the apertures 29 until the notches 31 register with the wall 28, and the levers are then moved into the narrow regions of the apertures 29. The struts 18 are then interposed between the levers and the pressure plate 13, as the latter is moved into operative relation to the levers, and subsequently the links 35 are attached to the pressure plate by means of the rivets 36, the retainer cups 39 being attached at the same time. This serves to secure the pressure plate, reaction member, and operating levers in loose assembled relation in which they may be freely handled without being able to become dissociated from their proper operative positions relative to one another. To this end, the fulcrum regions 43 of the reaction member are provided with steps 45 and the latter are provided with projections 46 against which the fulcrum fingers 24 of the levers are adapted to engage to limit the extent to which the fingers 24 may move toward the enlarged regions 34, at positions out of registry with said enlarged regions 34, in any of the positions of separation of the pressure plate and reaction member permitted by the retainer cups 39. The only manner in which the levers can be detached from their fulcrums after the clutch has been assembled, is by removing the rivets 36 and the retainer cups 39, then moving the pressure plate away from the reaction member so as to allow the levers 17 to be tilted to the left as viewed in Fig. 2, sufficiently to bring the fingers 24 into registry with the enlarged regions 34 of the apertures 29.

In the operation of the clutch, pressure is adapted to be applied to the inner ends of the operating levers 17 from the remote pressure springs hereinabove mentioned. Fulcruming against the fulcrum regions 43 of the reaction member, the levers 17 will swing to the left as viewed in Fig. 2, exerting thrust through the elements 18 against the pressure plate 13 and thereby causing the clutch to become engaged. The clutch is disengaged by removing the load of the remote pressure springs from the collar 15 in any suitable manner.

The fingers 24 of the operating levers are formed in substantially the same plane as the forward regions of the side flanges 23, and are connected to the intermediate regions of maximum thickness, by the inclined portions 47, which are adapted to clear the flange 27 of the reaction member sufficiently to allow the levers 17 the necessary radius of operating movement.

We claim:

1. In a friction clutch, an annular reaction member, generally polygonal and roughly Z-shaped in cross section, comprising an outer radial flange adapted to be attached to a driving member, an inner radial flange, and an axial wall joining said flanges and having spaced fulcrum apertures, a plurality of operating levers fulcrumed in said apertures, a pressure plate disposed between said reaction member and the driving member, and a plurality of flexible driving links disposed between said inner flange and the pressure plate, chordal to the pressure plate, registering with regions of said inner flange intervening between said fulcrum apertures, and attached at their respective ends to the pressure plate and said inner flange respectively.

2. In a friction clutch, an annular reaction member, generally in the form of a polygon, the sides of which comprise alternately arranged lever fulcrum portions and driving element pockets, a pressure plate, an operating lever fulcrumed in each of said fulcrum portions, and a flexible driving link disposed in each of said pockets, chordal to the pressure plate, substantially parallel to the plane of the pressure plate, and attached at its respective ends to the pressure plate and reaction member respectively.

3. In a friction clutch, a driving member, an annular reaction member secured thereto, a pressure plate disposed between the driving member and the reaction member, a driven plate disposed between the pressure plate and the driving member, a plurality of operating levers arranged radially with their outer ends fulcrumed on the reaction member, their intermediate regions in thrust transmitting association with said pressure plate and their inner ends adapted to receive thrust for packing said driven member between the pressure plate and the driving member, and a plurality of flexible driving links disposed between the reaction member and the pressure plate in positions normal to radii of the clutch axis and registering with portions of the reaction member intervening between said operating levers, said driving links being attached at their respective ends to said portions and to the pressure plate respectively.

4. A friction clutch as defined in claim 3, wherein said driving links are substantially bisected longitudinally by the radii to which they are normal.

5. A friction clutch as defined in claim 3, wherein said reaction member is narrow and substantially Z-shaped in cross section, including an outer radial flange by which it is attached to the driving member, an inner radial flange overlying said flexible driving links and the peripheral region of the pressure plate, and an axial wall connecting said flanges and provided with apertures in which said levers are fulcrumed.

6. In a friction clutch, a driving member, a pressure plate, a driven plate, an annular reaction member, substantially Z-shaped in cross section, comprising an outer radial flange attached to the driving member, an inner radial flange overlying the pressure plate, and an axial wall connecting said flanges and provided with circumferentially spaced fulcrum openings, a plurality of operating levers arranged radially with their outer ends fulcrumed in said openings, their intermediate regions in thrust transmitting association with the pressure plate and their inner ends adapted to receive thrust for packing said driven plate between the pressure plate and the driving member, and a plurality of flexible driving links disposed between said inner flange and the pressure plate in positions chordal to the pressure plate and attached at their respective ends to the pressure plate and said inner flange respectively.

7. A friction clutch as defined in claim 6, wherein said reaction member is in the form of a polygon, alternate sides of which comprise the lever fulcrum regions and the intervening sides of which accommodate the flexible driving links.

8. A friction clutch as defined in claim 3, wherein the flexible driving links are in the form of flat strips parallel to the plane of the pressure plate, and the reaction member includes radial flange regions between which, and the pressure plate, said strips are disposed.

9. A friction clutch as defined in claim 3, wherein the reaction member includes straight radial flange regions, normal to and bisected by, radii of the clutch axis, and wherein said flexible driving links are disposed in alignment with said regions, between said regions and the pressure plate.

10. An axially shallow friction clutch comprising a driven plate, a pressure plate, an annular reaction member, axially shallow and roughly Z-shaped in cross-section, comprising an outer radial flange adapted to be attached to a driving member, an inner radial flange partially overlying the pressure plate, and an axial wall joining said flanges and providing a plurality of circumferentially spaced lever fulcrum portions, and radially disposed operating levers having their outer ends fulcrumed on said fulcrum portions, their intermediate regions in clutch engaging thrust-transmitting association with said pressure plate, and their inner ends arranged to receive clutch engaging thrust, said intermediate regions being substantially coextensive in an axial direction with the space between the rear face of the pressure plate and said inner flange.

11. A friction clutch as defined in claim 10, wherein the thrust connections between the said levers and said pressure plate each comprise a T-shaped strut the head of which is received at one side in a transverse recess in its operating lever and engaged at its other side against the pressure plate, and the leg of which is received in a hole in the pressure plate.

12. A friction clutch as defined in claim 10, wherein said fulcrum portions are each provided with a fulcrum aperture through which the corresponding lever is extended, and the said axial wall portion is formed, between the outer flange and the fulcrum aperture, with a radially outwardly projecting step against which the outer end of the lever is adapted to engage to limit the possible swinging movement of the lever when the reaction member is detached from the driving member.

13. In a friction clutch, a pressure plate, an annular reaction member adapted to be attached to a driving member and having a radial flange region between which and the driving member the pressure plate is adapted to be positioned, and a flexible driving link disposed between the pressure plate and said flange region, a securing element attaching one end of said driving link to the rear face of the pressure plate, a flanged retainer cup also secured by said rivet, said flange region having a pair of spaced depressions extending toward the pressure plate, one of said depressions being attached to the other end of the flexible driving element and the other depression receiving said retainer cup and cooperating with the flange portion thereof to limit the separation of the pressure plate and said reaction member.

14. In a friction clutch, a pressure plate, a cover having a centrally apertured depressed region extending toward the pressure plate, and a member for limiting the separation of said cover and plate, comprising a sheet metal cup secured to the pressure plate, extending through the aperture in said depression, and having at its rim a flange extending radially outwardly for engagement with the wall of said depression defining said aperture.

15. An axially shallow friction clutch comprising a driven plate, a pressure plate, an annular reaction member circumscribing a space in which the pressure plate is received, said reaction member having a plurality of fulcrum portions disposed forwardly of the plane of its rear extremity, and a plurality of operating levers having intermediate regions substantially coextensive axially with the space between the rear surface of the pressure plate and said plane, said intermediate regions being in thrust transmitting association with the pressure plate, said levers being tapered forwardly from said intermediate regions to their outer ends and having said outer ends fulcrumed against said fulcrum portions, the inner ends of said levers being adapted to receive clutch engaging thrust directed toward the pressure plate.

16. An axially shallow friction clutch comprising a driving member, an annular reaction member secured thereto, said reaction member including an axial wall having a flange extending inwardly from the rear extremity thereof, a pressure plate disposed between the driving member and the reaction member, a driven plate disposed between the pressure plate and the driving member, a plurality of radially arranged levers for controlling the movement of said pressure plate, fulcrumed on said reaction member, said levers having intermediate regions that are substantially coextensive in axial dimension with the space between the rear face of the pressure plate and the plane of the rear extremity of the reaction member, and a plurality of flexible driving links disposed between said inner flange and the pressure plate, chordal to the pressure plate, registering with regions of said flange intervening between said fulcrum apertures, and attached at their respective ends to the pressure plate and said flange respectively.

17. An axially shallow friction clutch comprising a driving member, an annular reaction member secured thereto, a pressure plate disposed between the driving member and the reaction member, a driven plate disposed between the pressure plate and the driving member, a plurality of radially arranged levers for controlling the movement of said pressure plate, fulcrumed on said reaction member, said levers having intermediate regions that are substantially coextensive in axial dimension with the space between the rear face of the pressure plate and the plane of the rear extremity of the reaction member, and a plurality of flexible driving links disposed between the reaction member and the pressure plate, extending generally in circumferential directions, and disposed circumferentially intermediate said operating levers, said driving links being attached at their ends to said reaction member and pressure plate respectively.

18. An axially shallow friction clutch comprising a driven plate, a pressure plate, an annular reaction member circumscribing a space in which the pressure plate is received, said reaction member having a plurality of fulcrum portions disposed forwardly of the plane of its rear extremity, and a plurality of operating levers having intermediate regions substantially coextensive axially with the space between the rear surface of the pressure plate and said plane, said intermediate regions being in thrust transmitting association with the pressure plate, the outer ends of the levers being fulcrumed on said fulcrum portions, and the inner ends of the levers being arranged to receive clutch engaging thrust.

HAROLD NUTT.
LEO W. COOK.